(12) United States Patent
Ishikawa

(10) Patent No.: US 7,347,596 B2
(45) Date of Patent: Mar. 25, 2008

(54) BICYCLE LIGHT ATTACHMENT ASSEMBLY

(75) Inventor: Noriyasu Ishikawa, Izumiotsu (JP)

(73) Assignee: Shimano Inc., Osaka (JP)

( * ) Notice: Subject to any disclaimer, the term of this patent is extended or adjusted under 35 U.S.C. 154(b) by 381 days.

(21) Appl. No.: 11/192,136

(22) Filed: Jul. 29, 2005

(65) Prior Publication Data

US 2007/0044586 A1 Mar. 1, 2007

(51) Int. Cl.
*B62J 6/00* (2006.01)
*F21V 33/00* (2006.01)

(52) U.S. Cl. ....................... 362/473; 362/396

(58) Field of Classification Search ............... 362/473, 362/474, 475, 476, 191, 396
See application file for complete search history.

(56) References Cited

U.S. PATENT DOCUMENTS

| 621,374 | A | * | 3/1899 | Rhind | ............... 248/278.1 |
|---|---|---|---|---|---|
| 1,471,985 | A | | 10/1923 | Tower | |
| 2,010,058 | A | | 8/1935 | Oscar | |
| 2,710,334 | A | | 6/1955 | Peterson | |
| 3,878,387 | A | * | 4/1975 | Kovacic | ............... 362/473 |
| 3,961,811 | A | | 6/1976 | Brilando et al. | |
| 4,031,343 | A | * | 6/1977 | Sopko | ............... 200/61.12 |
| 4,697,725 | A | | 10/1987 | Miree | |
| 4,896,138 | A | * | 1/1990 | Nickols | ............... 340/479 |
| 5,504,662 | A | * | 4/1996 | Huang | ............... 362/473 |
| 5,523,925 | A | * | 6/1996 | Bare, IV | ............... 362/473 |
| 5,739,750 | A | * | 4/1998 | Drake | ............... 340/432 |
| 5,860,728 | A | | 1/1999 | Maglica | |
| 6,264,351 | B1 | | 7/2001 | Taylor et al. | |
| 6,428,192 | B1 | * | 8/2002 | Chen | ............... 362/474 |
| 2001/0030269 | A1 | | 10/2001 | Evans et al. | |

FOREIGN PATENT DOCUMENTS

| DE | 88-17-002 U1 | 9/1991 |
|---|---|---|
| DE | 297-05-624 U1 | 4/1998 |
| EP | 0-560-328 A1 | 9/1993 |
| EP | 0-646-519 A2 | 5/1994 |
| JP | H06-078183 U | 11/1994 |
| JP | 2005-8131 A | 1/2005 |
| WO | WO-98/06975 A | 2/1998 |
| WO | WO-01/56870 A | 8/2001 |

\* cited by examiner

*Primary Examiner*—John Anthony Ward
(74) *Attorney, Agent, or Firm*—Global IP Counselors, LLP

(57) ABSTRACT

A bicycle light attachment assembly includes a bracket, a lamp and a clamping member. The lamp is coupled to the bracket and the clamping member is pivotally coupled to the bracket. The clamping member and the bracket are arranged to clamp onto a brake mechanism supporting member on a bicycle frame.

12 Claims, 10 Drawing Sheets

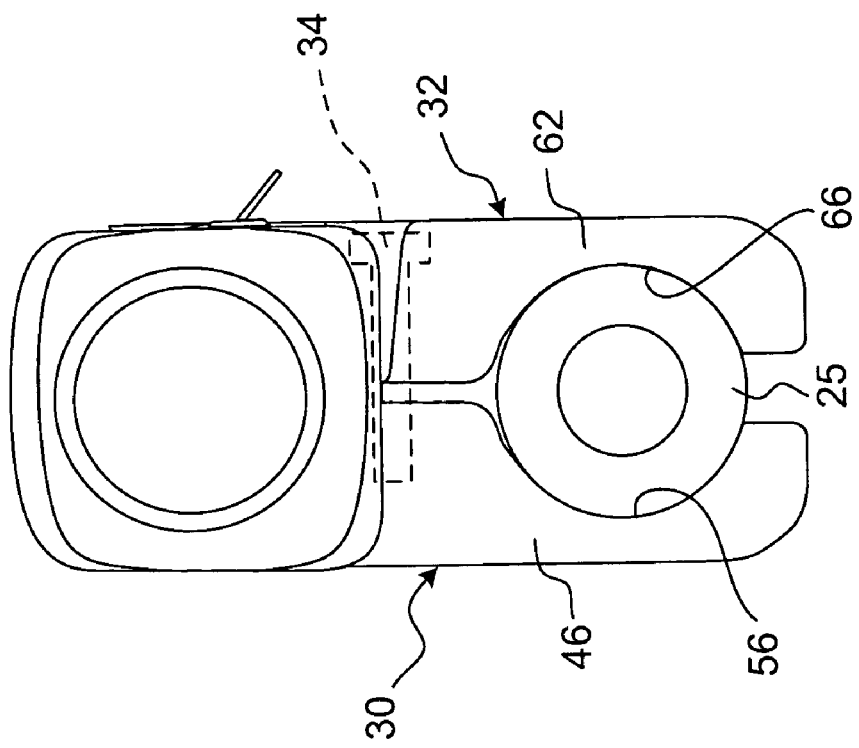
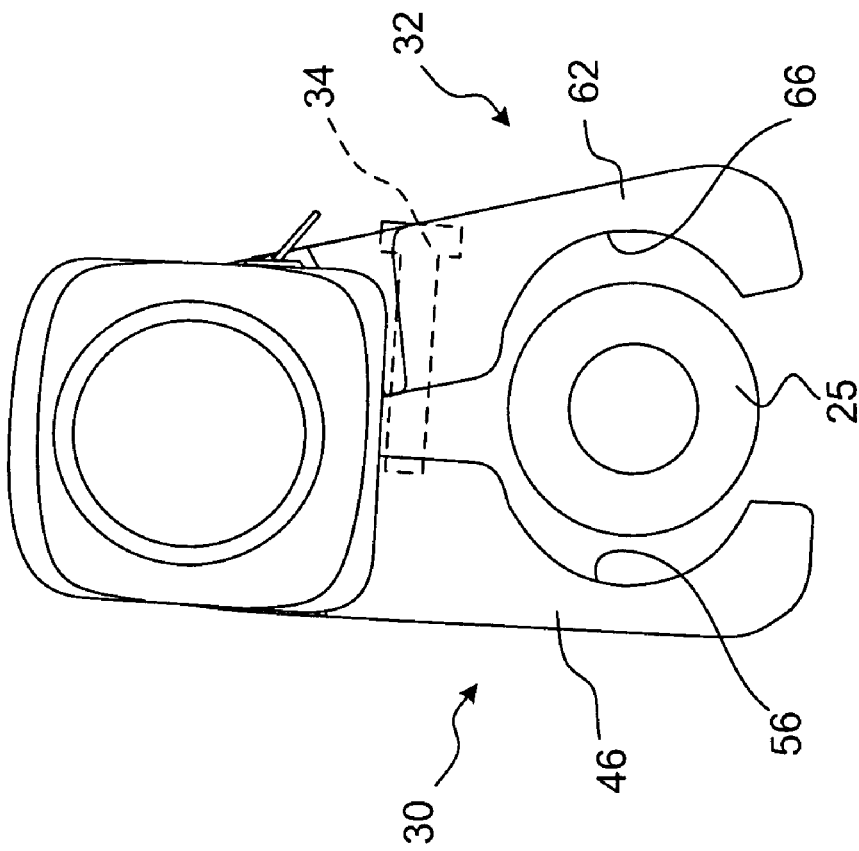

BICYCLE LIGHT ATTACHMENT ASSEMBLY

BACKGROUND OF THE INVENTION

1. Field of the Invention

This invention generally relates to bicycle light attachment assembly. More specifically, the present invention relates to bicycle light attachment assembly that includes a mounting mechanism for clamping to a brake mechanism supporting member.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle light.

Typically, bicycle lights are mounted to the handle bar of a bicycle. Such lights are not always attractive. It is desirable to have a bicycle light that attaches to a less intrusive portion of the bicycle.

In view of the above, it will be apparent to those skilled in the art from this disclosure that there exists a need for an improved bicycle light that mounts to more convenient locations on the bicycle frame. This invention addresses this need in the art as well as other needs, which will become apparent to those skilled in the art from this disclosure.

SUMMARY OF THE INVENTION

One object of the present invention is to provide a bicycle light attachment assembly that is easy to install on a bicycle frame.

Another object of the present invention is to provide a bicycle light attachment assembly that can be installed on a brake mechanism supporting member.

The foregoing objects can basically be attained by providing a bicycle light attachment assembly with a bracket, a lamp and a clamping member. The lamp is coupled to the bracket and the clamping member is pivotally coupled to the bracket. The clamping member and the bracket are arranged to clamp onto a brake mechanism supporting member on a bicycle frame.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 7A is a front view of the bicycle light attachment assembly showing a clamping mechanism open for installation on the brake mechanism supporting member in accordance with the first embodiment of the present invention;

FIG. 7B is a front view similar to FIG. 7A showing a clamping mechanism clamped on the brake mechanism supporting member in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
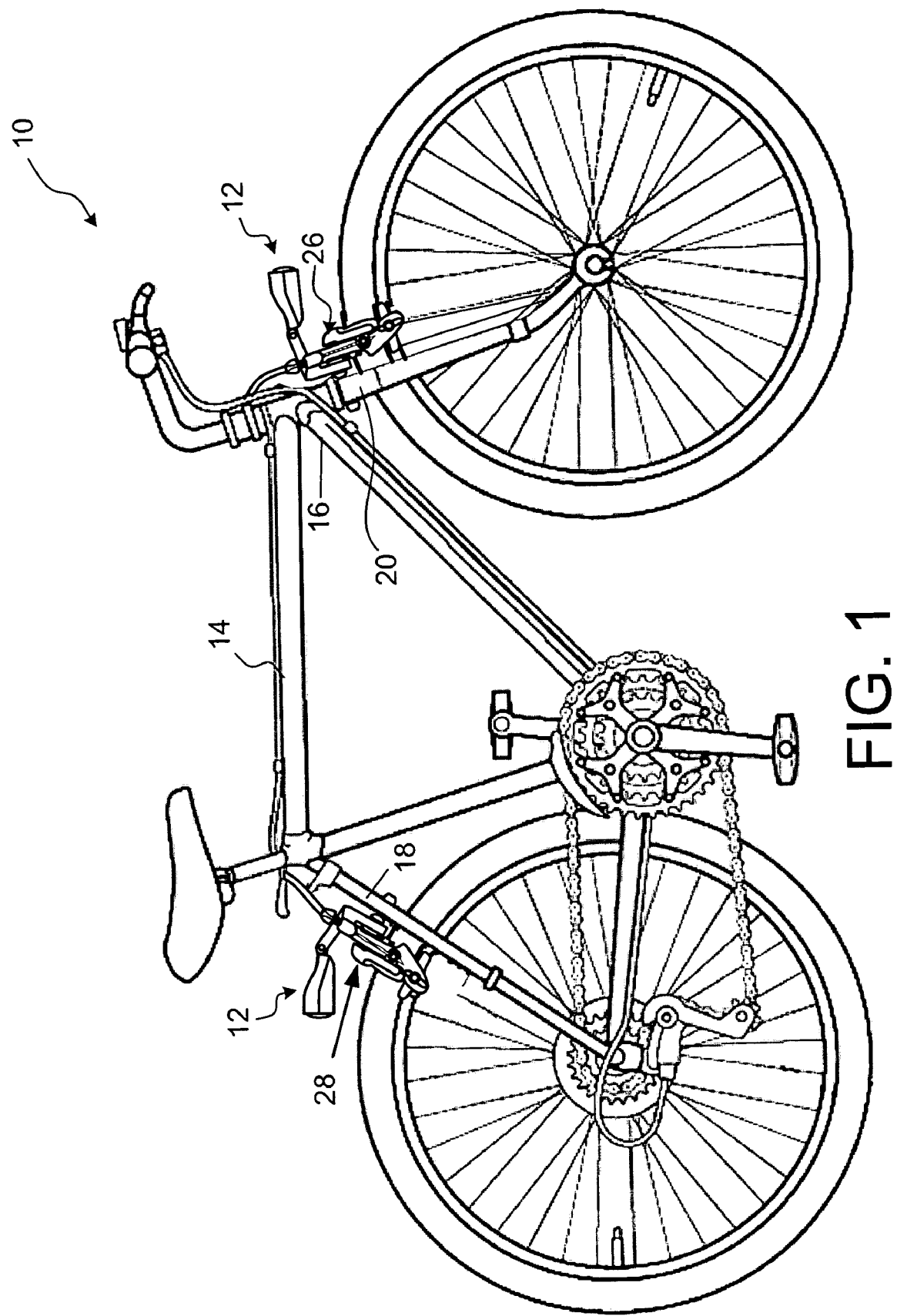
FIG. 1 is a side elevational view of a bicycle that includes a bicycle light attachment assembly in accordance with a first embodiment of the present invention.

Referring initially to FIG. 1, a bicycle 10 having a pair of bicycle light attachment assemblies 12 is illustrated in accordance with a first embodiment of the present invention. Although the bicycle 10, as shown in FIG. 1, can be provided with two bicycle light attachment assemblies 12, it should be understood from the drawings and description below that the bicycle 10 can alternatively be provided with only one bicycle light attachment assembly 12 in either of the front and rear locations depicted.

Figure 2:
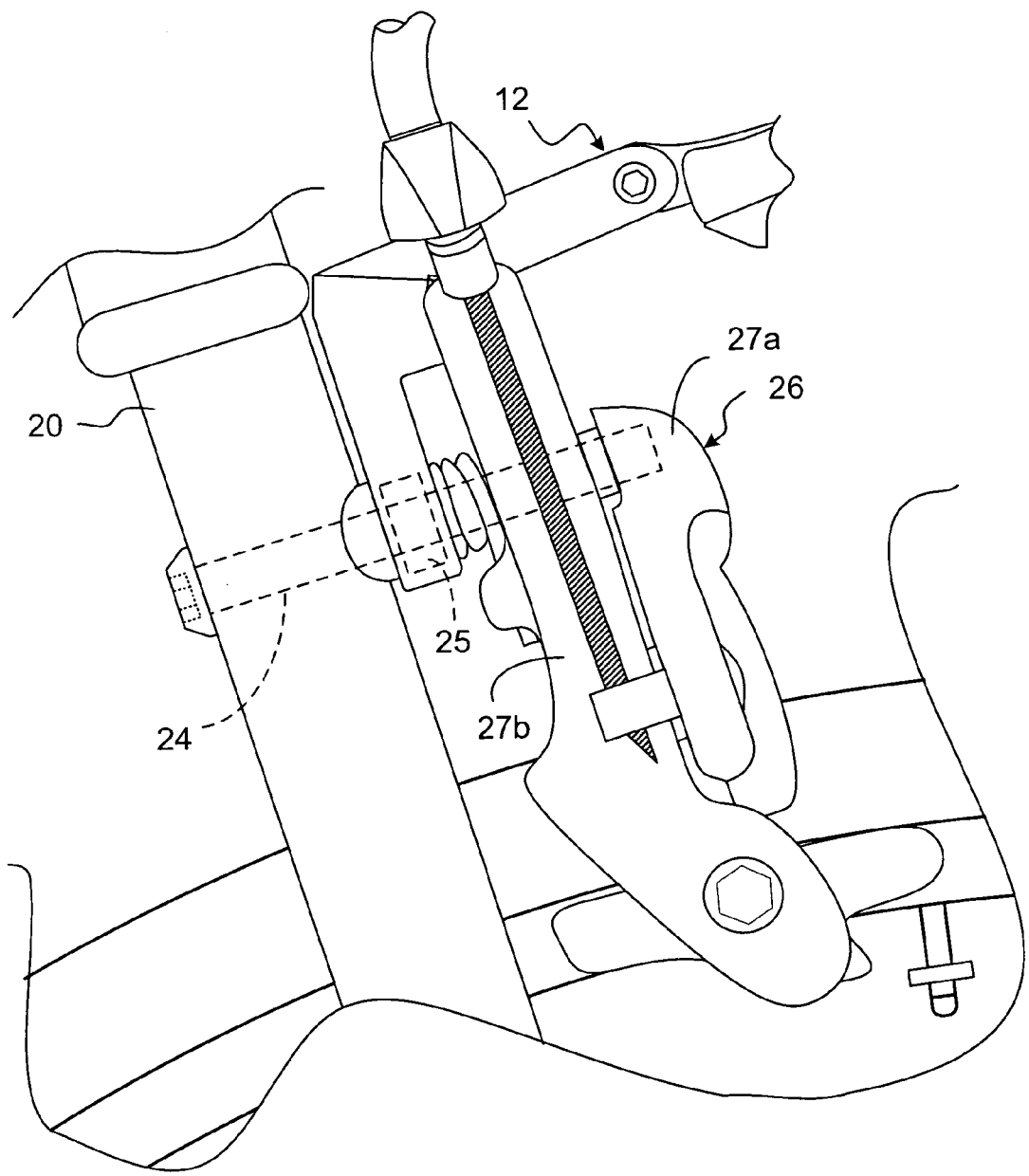
FIG. 2 a fragmentary side view of a front portion of the bicycle showing a portion of the bicycle light attachment assembly installed on a brake mechanism supporting member of the bicycle in accordance with the first embodiment of the present invention.
Figure 3:
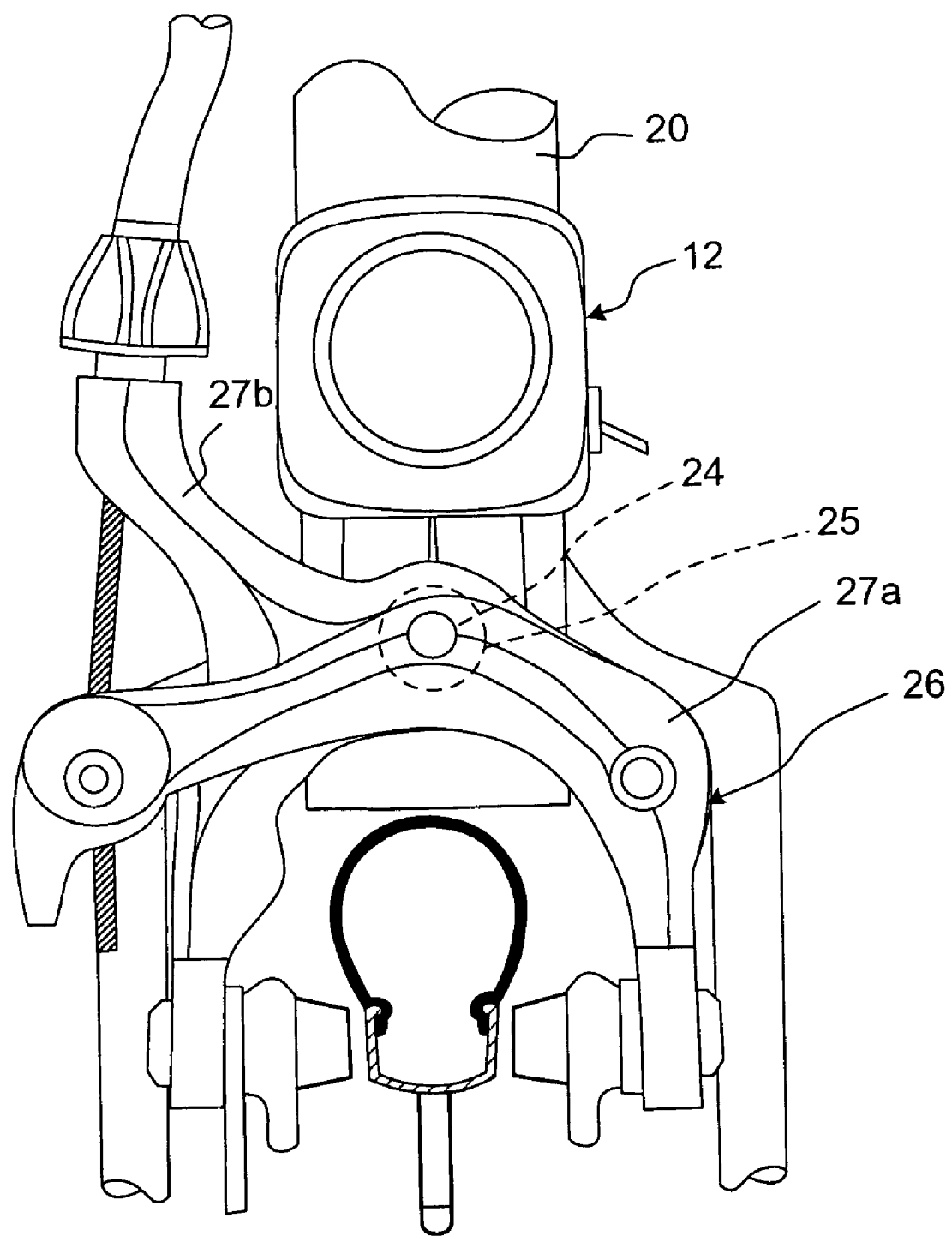
FIG. 3 is a front elevational view of a portion of the bicycle showing the bicycle light attachment assembly installed on a brake mechanism supporting member of the bicycle in accordance with the first embodiment of the present invention.

Specifically, the bicycle 10 includes a bicycle frame 14 having a front portion 16 and a rear portion 18. The front portion 16 rotatably supports a front fork 20. As shown more clearly in FIG. 6, the front fork 20 is formed with an aperture 22 that receives and supports a brake mechanism supporting member 24. As indicated in FIG. 2, a brake mechanism 26 is supported on the front fork 16 of the bicycle frame 14 by the brake mechanism supporting member 24. As is described in greater detail below, one of the bicycle light attachment assemblies 12 is supported on the brake mechanism supporting member 24 adjacent to the brake mechanism 26 at the front portion 16 of the bicycle frame 14. Similarly, another of the bicycle light attachment assemblies 12 can be installed at the rear portion 18 of the bicycle frame 14, as described below.

The brake mechanism supporting member 24 is depicted in the drawings as a bolt mounted to the bicycle frame 14. The brake mechanism supporting member 24 includes a securing member 25 that is fixed to the brake mechanism supporting member 24. The brake mechanism supporting member 24 can be an elongated bolt threaded into the aperture 22 (FIG. 6) for supporting the brake mechanism 26. The securing member 25 can be a threaded nut installed on the brake mechanism supporting member 24. Alternatively, the securing member 25 can be welded to the brake mechanism supporting member 24 or the front fork 20. Alternatively, the securing member 25 can be integrally formed with the brake mechanism supporting member 24 as a single element. As well, the brake mechanism supporting member 24 can alternatively be a shaft welded to the bicycle frame 14. Further, the securing member 25 can be a removable nut threaded onto the brake mechanism supporting member 24 or alternatively, can be an annular flange that is welded or otherwise fixedly attached to the bicycle frame 14. In other words, the brake mechanism supporting member 24 and/or the securing member 25 can have any of a variety of configurations that support the brake mechanism 26 and can further support the removable bicycle light attachment assembly 12.

As shown best in FIG. 1, the brake mechanism supporting member 24 supports the brake mechanism 26 proximate the front portion 16 of the bicycle frame 14. Such brake mechanisms 26 typically include a pair of arcuate shaped caliper arms 27a and 27b that are pivotally supported on the brake mechanism supporting member 24. The brake mechanism 26 is a caliper-type brake mechanism that can be any of a variety conventional caliper-type brake mechanism. Therefore, description of the brake mechanism 26 is omitted for brevity.

Similarly, another brake mechanism 28 is preferably supported proximate the rear portion 18 of the bicycle frame 14. The brake mechanism 28 is also a caliper-type brake mechanism. The second of the bicycle light attachment assemblies 12 can be on another brake mechanism supporting member 24 mounted at the rear portion 18 of the bicycle frame 14. It should be understood that the present invention relates to the various features of the bicycle light attachment assembly 12. The bicycle 10 can be provided with only one the bicycle light attachment assembly 12. Although two the bicycle light attachment assemblies 12 are depicted in FIG. 1, two are included to demonstrate the various locations one bicycle light attachment assembly 12 can be installed. Use of a second of the bicycle light attachment assemblies 12 is optional.

Since the structure of the bicycle light attachment assembly 12 is generally the same whether mounted on the front portion 16 or the rear portion 18 of the bicycle frame 14, description of only one bicycle light attachment assembly 12 is provided for the sake of brevity. However, it should be understood from the drawings and the description herein that the bicycle light attachment assembly 12 of the present invention can be mounted to either the front or the rear portion 16 or 18 of the bicycle frame 14.

Figure 4:
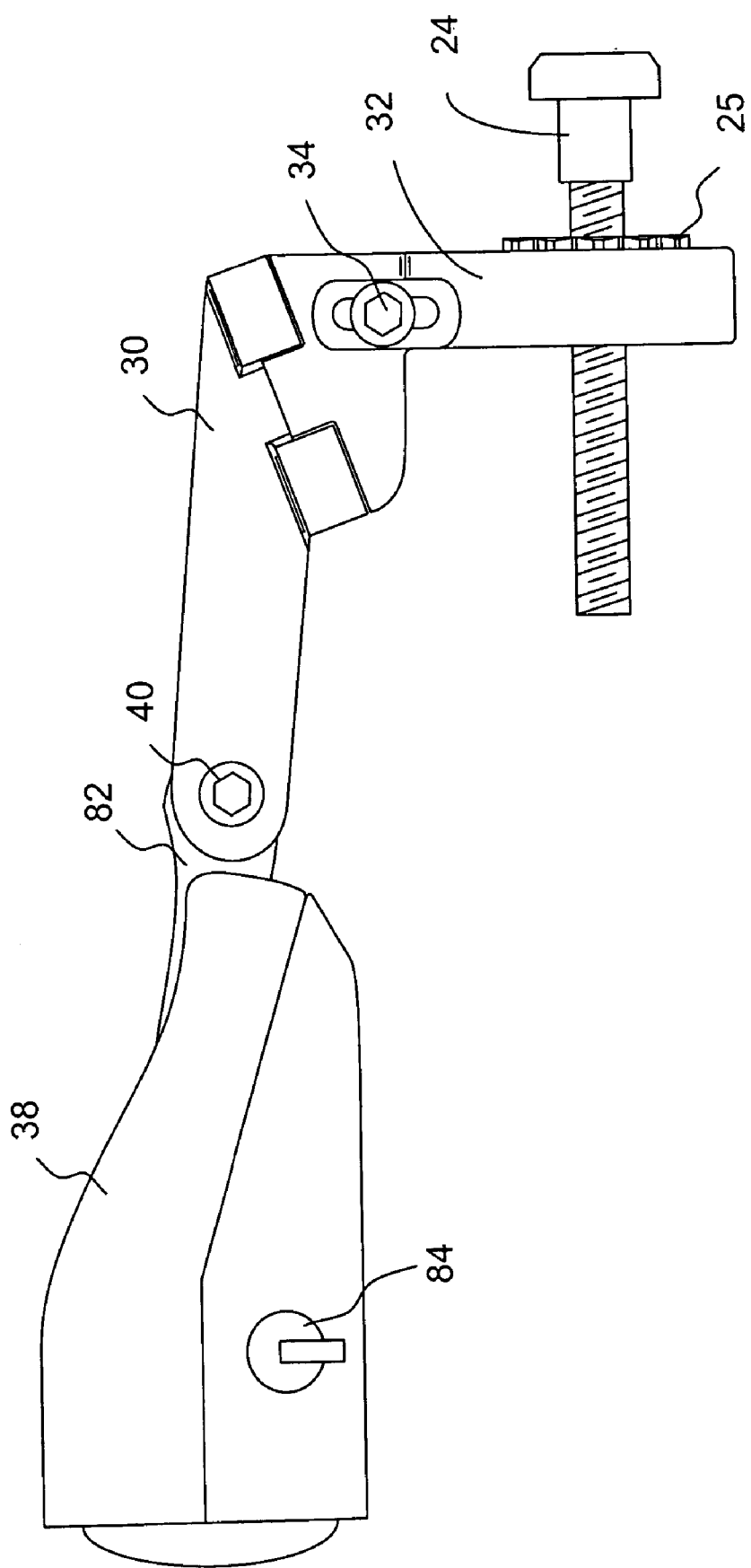
FIG. 4 is a side view of the bicycle light attachment assembly and the brake mechanism supporting member shown removed from the bicycle to provide greater clarity in accordance with the first embodiment of the present invention.
Figure 5:
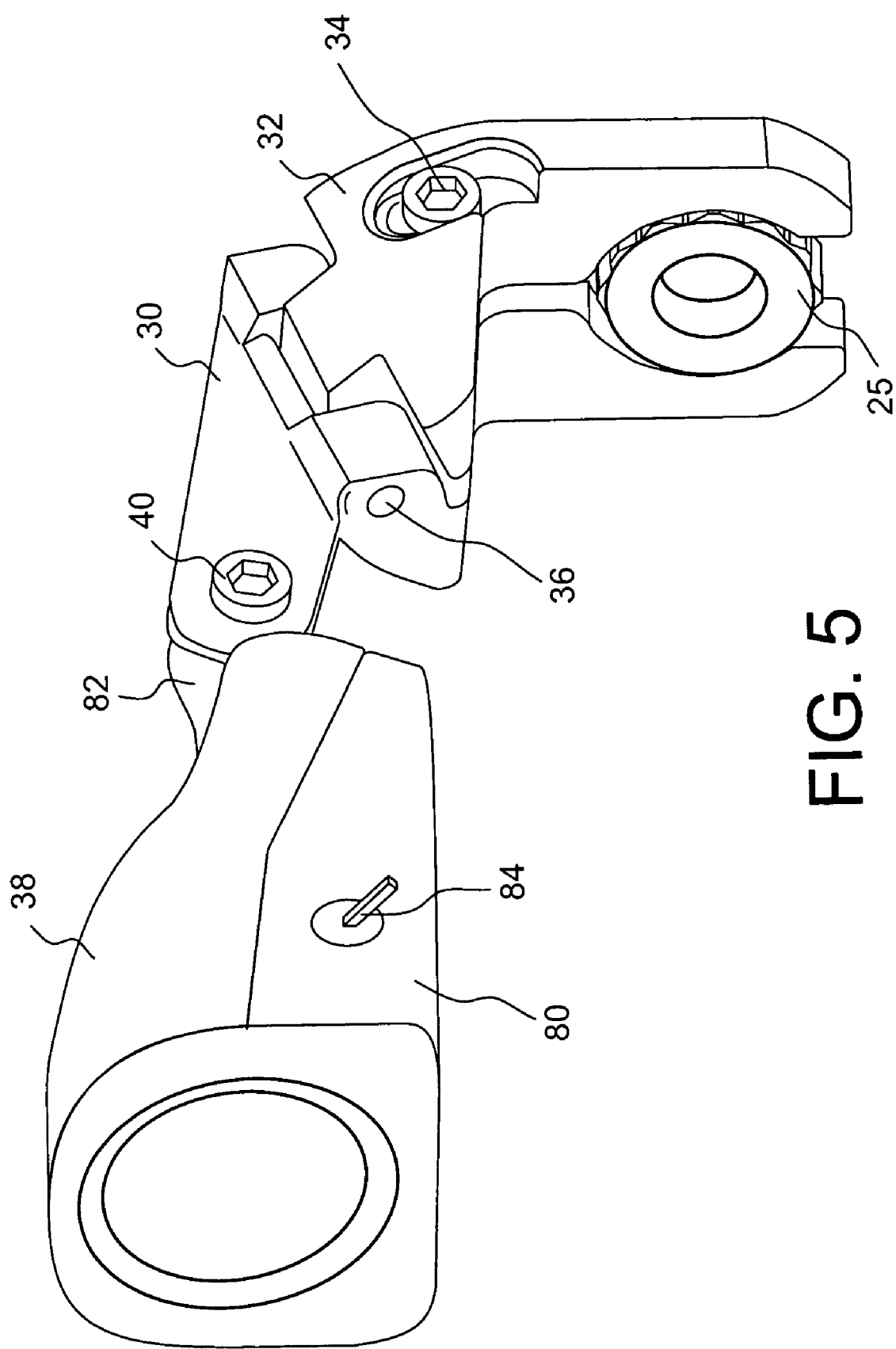
FIG. 5 is a perspective view of the bicycle light attachment assembly and the brake mechanism supporting member shown removed from the bicycle to provide greater clarity in accordance with the first embodiment of the present invention.
Figure 6:
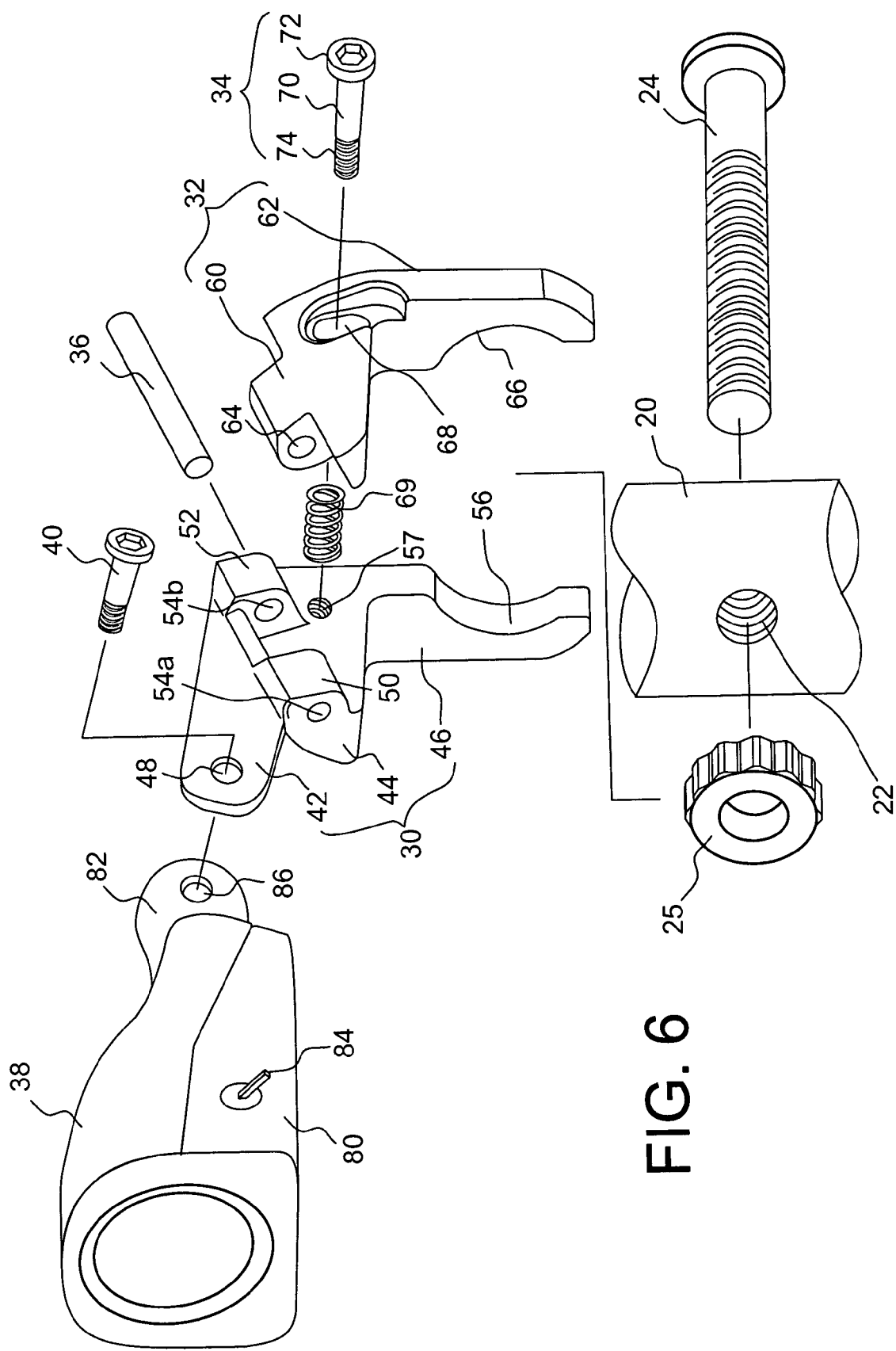
FIG. 6 is an exploded perspective view similar to FIG. 5 showing the various members of the bicycle light attachment assembly and the brake mechanism supporting member in accordance with the first embodiment of the present invention.

With specific reference to FIGS. 4, 5 and 6, the bicycle light attachment assembly 12 is now described in greater detail. The bicycle light attachment assembly 12 basically includes a bracket 30, a clamping member 32, a fixing bolt 34, a pivot pin 36, a lamp 38 and an adjuster bolt 40.

As shown in FIG. 6, the bracket 30 includes a lamp supporting portion 42, a first hinge portion 44 and a first clamping portion 46. The lamp supporting portion 42, the first hinge portion 44 and the first clamping portion 46 are preferably integrally formed as a single member but may alternatively be formed as two or more separate elements fixedly attached or welded together. In the preferred embodiment, the bracket 30 is made of a metallic material, such as an aluminum alloy, but can alternatively be formed from plastic materials, composite materials and/or polymer based materials.

The lamp supporting portion 42 includes an elongated flat bar part formed with an aperture 48 at a distal end thereof. The first hinge portion 44 includes a first block 50 and a second block 52 that are spaced apart from another. The first and second blocks 50 and 52 are formed with apertures 54a and 54b, which are axially aligned with one another in order to receive the pivot pin 36, as is described in greater detail below. The first clamping portion 46 is formed with a first engaging surface 56 or clamping surface and a threaded aperture 57. The first engaging surface 56 is formed with an arcuate or semi-circular shape.

When installed on the bicycle 10, the bracket 30 extends in a direction approximately parallel to the brake mechanism supporting member 24. More specifically, the lamp supporting portion 42 extends in a direction approximately parallel to the brake mechanism supporting member 24 when installed on the brake mechanism supporting member 24 of the bicycle 10.

As shown in FIGS. 5, 7A and 7B, the clamping member 32 is pivotally coupled to the bracket 30 such that the clamping member 32 and the bracket 30 are arranged to clamp onto the brake mechanism supporting member 24 on the bicycle frame 14. As shown more clearly in FIG. 6, the clamping member 32 basically includes a second hinge portion 60 and a second clamping portion 62. The second hinge portion 60 is a block or protrusion that extends upward from a central portion of the clamping member 32. The second hinge portion 60 is formed with an aperture 64. With the second hinge portion 60 inserted between the first and second blocks 50 and 52 of the first hinge portion 44 of the bracket 30, the pivot pin 36 extends through the apertures 54a, 64 and 54b. Consequently, the first and second hinge portions 44 and 60 are pivotally coupled to one another.

The second clamping portion 62 of the clamping member 32 is formed with a second engaging surface 66 or clamping surface and an oblong aperture 68. The second engaging surface 66 is formed with an arcuate or semi-circular shape. The shape of the second engaging surface 66 compliments the shape of the first engaging surface 56 of the first clamping portion 46 of the bracket 30. Specifically, the first engaging surface 56 of the bracket 30 and the second engaging surface 66 of the clamping member 32 are shaped to conform to an outer peripheral surface of the securing member 25, as indicated in FIG. 5. The oblong aperture 68 is shaped to accommodate the fixing bolt 34. Further, the oblong aperture 68 is recessed in from the outer surface of the clamping member 32, as shown in FIGS. 5 and 6.

As shown in FIG. 6, the fixing bolt 34 includes a shaft portion 70 and a head portion 72. The shaft portion 70 includes machine threads 74. The fixing bolt 34 is dimensioned such that the shaft portion 70 extends through the oblong aperture 68 in the second clamping portion 62 of the clamping member 32. The machine threads 74 engage and are retained in the threaded aperture 57 of the first clamping portion 46 of the bracket 30. However, the head portion 72 of the fixing bolt 34 has a diameter that is larger than the width of the oblong aperture 68. Therefore, as the fixing bolt 34 is tightened into the threaded aperture 57 of the bracket 30, the clamping member 32 is moved toward the first clamping portion 46 as the clamping member 32 pivots about the pivot pin 36. The fixing bolt 34 therefore provides a clamping force between the clamping member 32 and the bracket 30. It should be noted that the fixing bolt 34 preferably extends in a direction that is generally perpendicular to the brake mechanism supporting member 24 with the bicycle light attachment assembly 12 installed on the brake mechanism supporting member 24.

It should be understood from the drawings and the description herein that the oblong aperture 68 provides a space for the fixing bolt 34 as the first clamping portion 46 pivots about the pivot pin 36. Specifically, the fixing bolt 34 is threaded into the threaded aperture 57 in the bracket 30. Consequently, the fixing bolt 34 remains in a fixed orientation with respect to the bracket 30. Specifically, the fixing bolt 34 remains approximately perpendicular to the first clamping portion 46 of the bracket 30 as long as a portion of the fixing bolt 34 is threaded into the threaded aperture 57. The clamping member 32 pivots about the pivot pin 36 relative to the bracket 30. When the clamping member 32 is tightened by the fixing bolt 34 to mount the bicycle light attachment assembly 12 onto the brake mechanism supporting member 24, the second clamping portion 62 of the clamping member 32 extends in a direction generally parallel to the first clamping portion 46 of the bracket 30. In this condition, the fixing bolt 34 is generally perpendicular to the clamping member 32, as indicated in FIG. 7B. However, in order to remove or install the bicycle light attachment assembly 12, the fixing bolt 34 must be loosened and the clamping member 32 pivoted to an orientation similar to that depicted in FIG. 7A. The shape of the oblong aperture 68 allows the clamping member 32 to pivot relative to the bracket 30 without completely removing the fixing bolt 34.

The fixing bolt 34 also retains a spring 69 (FIG. 6) between inner surfaces of the first clamping portion 46 of the bracket 30 and the second clamping portion 62 of the clamping member 32. Specifically, the fixing bolt 34 extends through the interior of the spring 69. The spring 69 biases the clamping member 32 away from the bracket 30 such that when the fixing bolt 34 is loosened, the clamping member 32 moves away from the bracket 30, as shown in FIG. 7A.

As indicated in FIG. 6, the pivot pin 36 extends through the first hinge portion 44 and the second hinge portion 60 pivotally coupling first hinge portion 44 to second hinge portion 60. The pivot pin 36 further extends in a direction generally parallel to the brake mechanism supporting member 24 with the bicycle light attachment assembly 12 installed on the brake mechanism supporting member 24. The pivot pin 36 further extends in a direction generally perpendicular to the length of the pivot pin 36.

As should be understood from the drawings and description herein, the bracket 30 and the clamping member 32 form a mounting mechanism for clamping the bicycle light attachment assembly 12 to the brake mechanism supporting member 24.

The lamp 38 is adjustably supported on the bracket 30. The lamp basically includes a lamp housing 80 and an attachment extension 82. The lamp housing 80 includes a control switch 84 and internal components common to such lamps, such as a bulb and connectors to a power supply (not shown). The power supply can be a generator (not shown) installed on the bicycle 10 or an internal battery (not shown). The attachment extension 82 includes an aperture 86. As shown in FIG. 4 and indicated in FIG. 6, the adjuster bolt 40 extends through the aperture 48 in the lamp supporting portion 42 of the bracket 30 and through the aperture 86 in the attachment extension 82 of the lamp 38. Hence, the lamp 38 is coupled to the bracket 30 by the adjuster bolt 40. By loosening and retightening the adjuster bolt 40, the angular orientation of the lamp 38 can be adjusted. As shown in FIGS. 4, 5 and 6, the lamp preferably extends in a direction away from the first clamping portion 46 of bracket 30.

As indicated in FIGS. 7A and 7B, the bicycle lamp attachment assembly 12 can be installed on the bicycle 10. In FIG. 7A, the fixing bolt 34 is loosened and the first clamping portion 46 pivoted to increase the distance between the second engaging surface 66 of the first clamping portion 46 and the first engaging surface 56 of the bracket 30. As shown in FIG. 7B, by tightening the fixing bolt 34, the distance between the second engaging surface 66 of the first clamping portion 46 and the first engaging surface 56 of the bracket 30 is reduced until the first and second engaging surfaces 56 and 66 engage and clamp the securing member 25 of the brake mechanism supporting member 24.

As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention.

Second Embodiment

Figure 8:
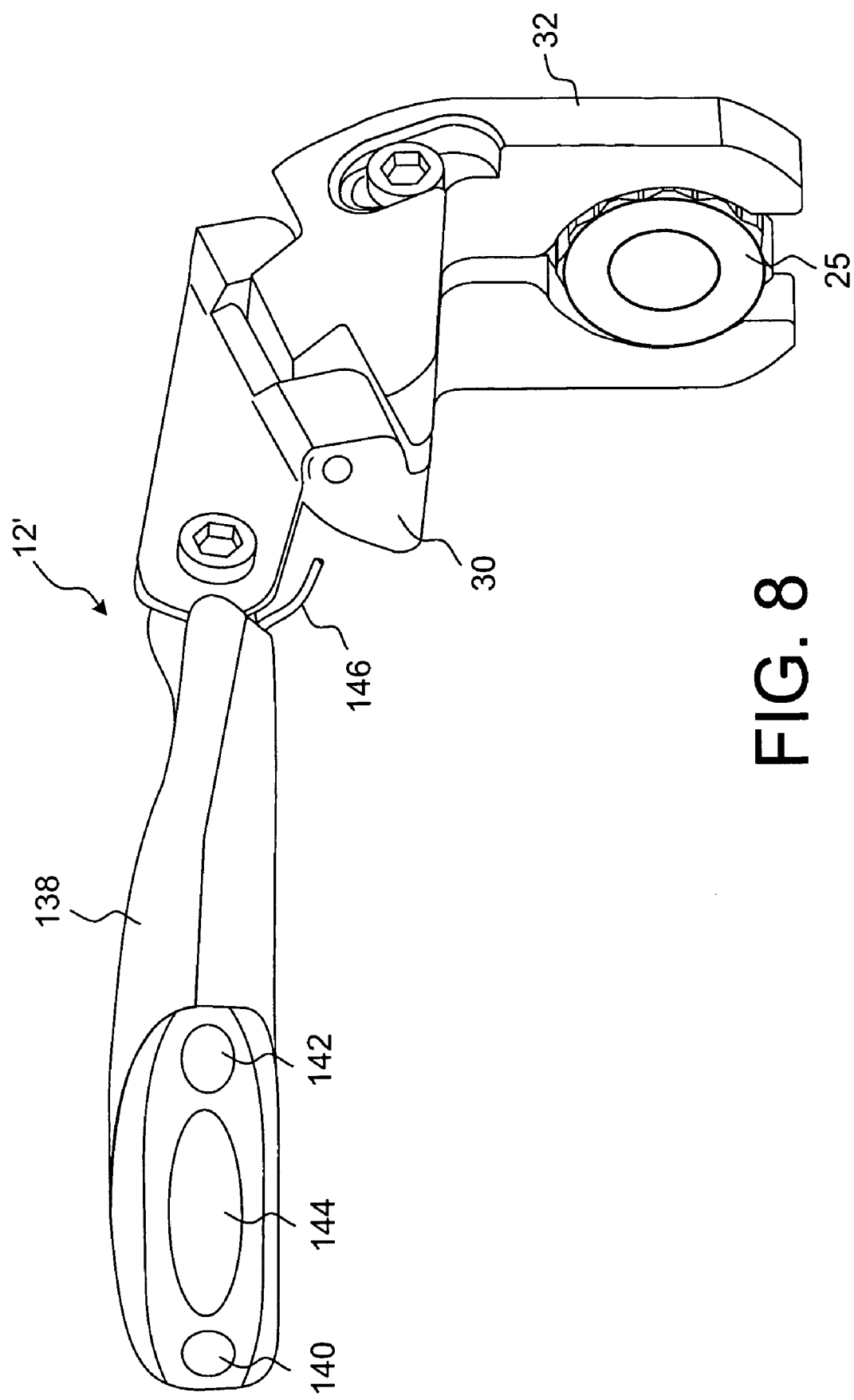
FIG. 8 is a perspective view of a bicycle light attachment assembly in accordance with a second embodiment of the present invention.

Referring now to FIG. 8, a bicycle lamp attachment assembly 12' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the bracket 30 and clamping member 32 are generally identical to the first embodiment. In the second embodiment, a lamp 138 is attached to the bracket 30 in a manner similar to the lamp 38 of the first embodiment. However, the lamp 138 differs in shape and function from the lamp 38. Specifically, the lamp 138 includes a first directional indicator light 140, a second directional indicator light 142 and a main light 144. The first directional indicator light 140 and the second directional indicator light 142 are preferably controlled remotely from a signal switching device (not shown) that is mounted on the handlebar of the bicycle for operation by a cyclist to indicate turning direction. The signal switching device is connected to the lamp 138 via electric wire bundle 146 that extends to the handlebar of the bicycle. Similarly, the main light 144 is also operated remotely.

As is indicated in FIG. 8, the lamp 138 has a rectangular shaped lens face, while the lamp 38 of the first embodiment has a more square shaped lens face.

Third Embodiment

Figure 9:
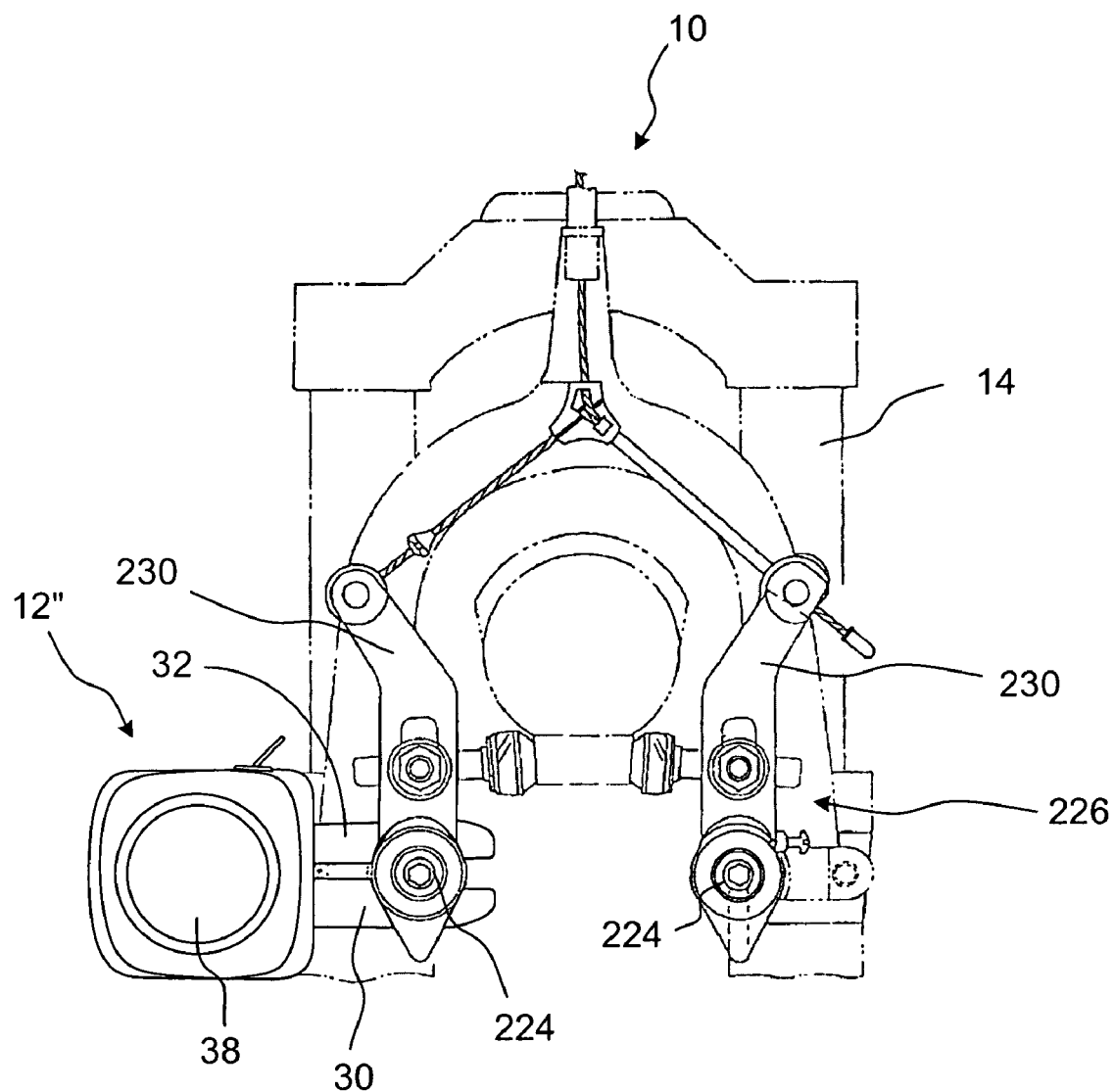
FIG. 9 is a front view of a bicycle light attachment assembly in accordance with a third embodiment of the present invention.
Figure 10:
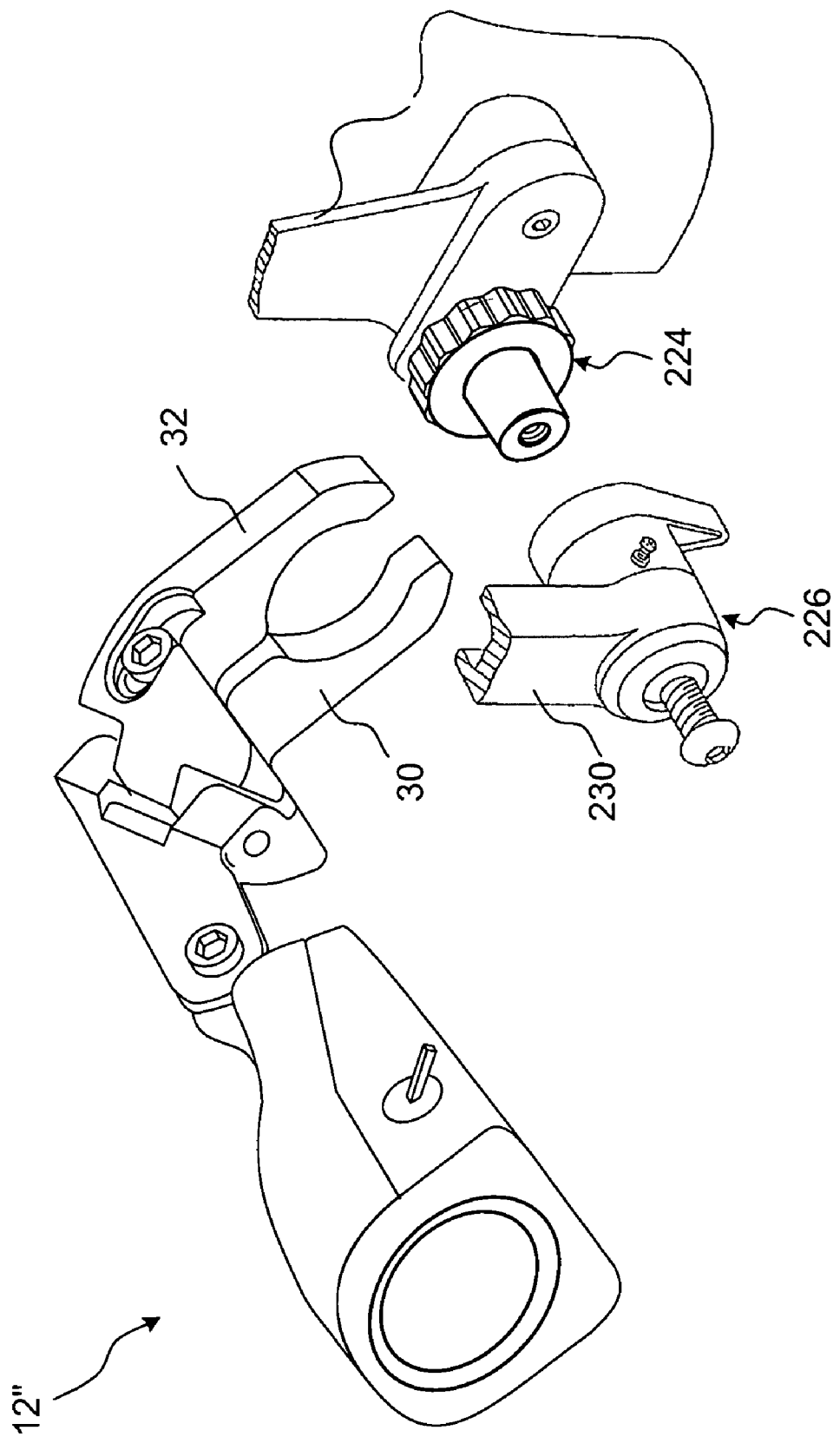
FIG. 10 is a partial exploded view of the bicycle light attachment assembly indicating installation on the brake mechanism supporting member in accordance with the third embodiment of the present invention.

Referring now to FIGS. 9 and 10, a bicycle lamp attachment assembly 12" in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, all elements of the bicycle lamp attachment assembly 12" are generally the same as in the first embodiment. However, in the third embodiment, the bicycle lamp attachment assembly 12" is installed on a brake mechanism supporting member 224 that supports a portion of a cantilever brake system 226.

In the first and second embodiments, the bicycle lamp attachment assembly 12 and bicycle lamp attachment assembly 12' were preferably installed on the brake mechanism supporting member 24 which supports a caliper-type brake mechanism, such as the brake mechanism 26 or 28. As such, the bicycle lamp attachment assembly 12 and bicycle lamp attachment assembly 12' were centered on the bicycle frame 14 (with respect to lateral sides of the bicycle 10). With the third embodiment, the cantilever brake system 226 includes two generally parallel brake mechanism supporting members 224 and two brake levers 230. Consequently, the bicycle lamp attachment assembly 12" can be attached to either one of the two brake mechanism supporting members 224. However, in order to assure proper operation of the cantilever brake system 226, the bicycle lamp attachment assembly 12" can be oriented at an angle with respect to the vertical. For example, as shown in FIG. 9, the bicycle lamp attachment assembly 12" can extend to the side of the bicycle frame 14 with the lamp 38 pointing toward the front (or rear) of the bicycle 10. Alternatively, as indicated in FIG. 10, the bicycle lamp attachment assembly 12" can be installed at any convenient inclined angle that allows proper operation of the cantilever brake system 226.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle light attachment assembly comprising:
   a bracket including a clamping end and a lamp supporting end, the clamping end formed with first hinge portion and the clamping member formed with a second hinge portion, the first and second hinge portions pivotally coupled to one another;
   a lamp coupled to the bracket; and
   a clamping member pivotally coupled to the bracket, the clamping member and the bracket arranged to clamp onto a brake mechanism supporting member on a bicycle frame.

2. The bicycle light attachment assembly according to claim 1, further comprising:
   a fixing bolt that extends through portions of the clamping end of the bracket and the clamping member providing a clamping force therebetween.

3. The bicycle light attachment assembly according to claim 2 wherein
   the fixing bolt extends in a direction generally perpendicular to the brake mechanism supporting member with the bicycle light affachment assembly installed on the brake mechanism supporting member.

4. The bicycle light attachment assembly according to claim 1, further comprising:
   a pivot pin extending through the first hinge portion and the second hinge portion pivotally coupling the first hinge portion to the second hinge portion.

5. The bicycle light attachment assembly according to claim 4 wherein
   the pivot pin extends in a direction generally parallel to the brake mechanism supporting member with the bicycle light attachment assembly installed on the brake mechanism supporting member.

6. The bicycle light attachment assembly according to claim 5 further comprising:
   a fixing bolt extending through portions of the clamping end of the bracket and the clamping member, the fixing bolt extending in a direction generally perpendicular to the pivot pin.

7. The bicycle light attachment assembly according to claim 1 wherein
   the lamp is adjustably attached to the lamp supporting end of the bracket.

8. The bicycle light attachment assembly according to claim 7 wherein
   the lamp extends in a direction away from the clamping end of the bracket.

9. A bicycle light attachment assembly comprising:
   a bracket;
   a lamp coupled to the bracket; and
   a clamping member pivotally coupled to the bracket, the clamping member and the bracket arranged to clamp onto a brake mechanism supporting member on a bicycle frame,
   a portion of the bracket and a portion of the clamping member being formed with engaging surfaces shaped to conform to a surface of the brake mechanism supporting member.

10. A bicycle light attachment assembly comprising:
    a bracket;
    a lamp coupled to the bracket; and a clamping member pivotally coupled to the bracket, the clamping member and the bracket arranged to clamp onto a brake mechanism supporting member on a bicycle frame, the bracket extending in a direction approximately parallel to the brake mechanism supporting member with the bicycle light attachment assembly installed on the brake mechanism supporting member.

11. A bicycle light attachment assembly comprising:

a bracket;

a lamp coupled to the bracket; and a clamping member pivotally coupled to the bracket, the clamping member and the bracket arranged to clamp onto a brake mechanism supporting member on a bicycle frame, the brake mechanism supporting member being arranged and configured to support a caliper-type brake assembly.

12. A bicycle light attachment assembly comprising:

a bracket;

a lamp coupled to the bracket; and a clamping member pivotally coupled to the bracket, the clamping member and the bracket arranged to clamp onto a brake mechanism supporting member on a bicycle frame, the brake mechanism supporting member being arranged and configured to support a brake arm of a cantilever brake system.

* * * * *